Figure 1:
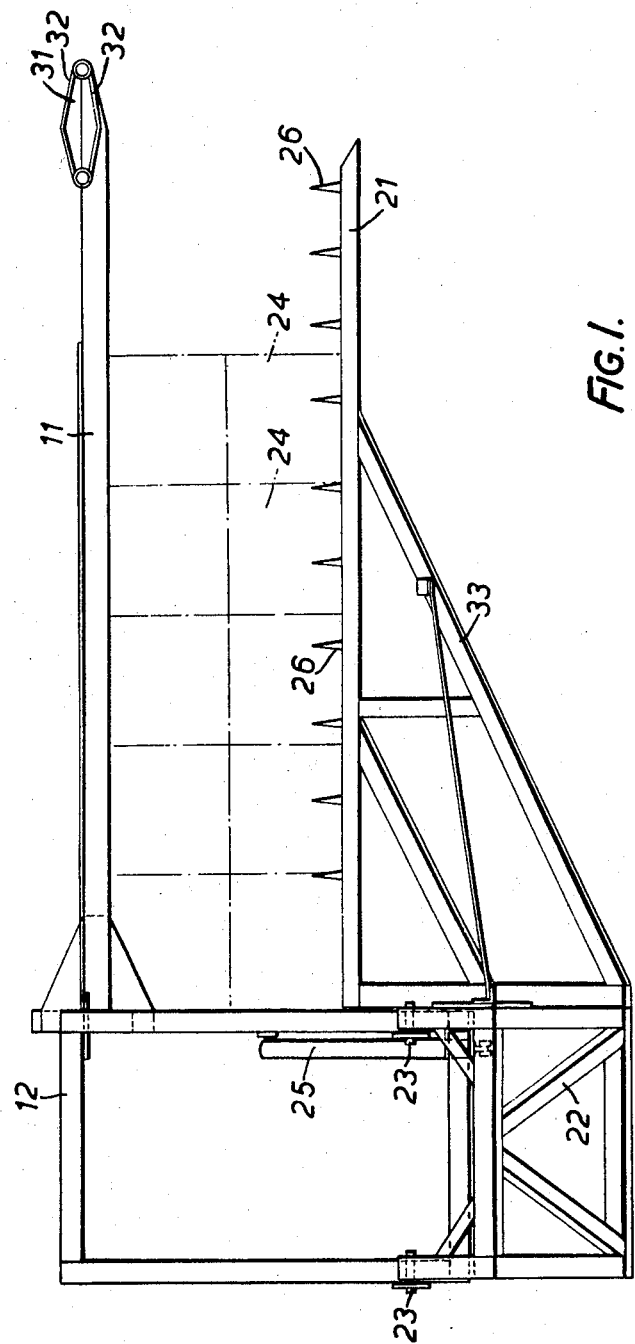

United States Patent [19]

Taylor-Hawkins

[11] 3,771,678

[45] Nov. 13, 1973

[54] LOADER

[75] Inventor: Peter Arthur Taylor-Hawkins, Cholsey, near Wallingford, Berkshire, England

[73] Assignee: Pattersons Venture, Ltd., Wallingford, England

[22] Filed: Mar. 16, 1971

[21] Appl. No.: 124,872

[52] U.S. Cl. ............ 214/147 G, 214/653, 214/655, 294/67 BC, 294/104
[51] Int. Cl. ............................................. B66c 1/58
[58] Field of Search ................ 214/147 R, 377, 379, 214/380, 383, 650 R, 651, 653, 655, 381, 382, 620, 147 G; 294/67 BC, 104, 61

[56] References Cited
UNITED STATES PATENTS

| | | | |
|---|---|---|---|
| 2,509,023 | 5/1950 | Vogel et al. | 214/653 |
| 2,979,216 | 4/1961 | Edwards | 214/653 X |
| 3,241,695 | 3/1966 | Bishop | 214/653 X |
| 3,401,810 | 9/1968 | Grey | 214/147 R X |

FOREIGN PATENTS OR APPLICATIONS 975,212  11/1964  Great Britain ............... 214/147 R Primary Examiner—Robert G. Sheridan
Assistant Examiner—George F. Abraham
Attorney—Watson, Cole, Grindle & Watson

[57] ABSTRACT

This invention is a device for handling large loads on farms for example banded stacks of bails of hay. A rigid forwardly directed boom co-operates with a gripping boom which can swing down about a horizontal axis to grip the load without an underneath supporting surface.

9 Claims, 4 Drawing Figures

LOADER

This invention relates to a loader and one object is to provide a loader which is suitable for attachment to, and operation by, a tractor for carrying and stacking large bales of straw or hay. If conventional bales are stacked together and then banded into a single large package with perhaps 10 or 20 individual bales tightly held together by a band, the bales can be handled much more quickly and efficiently, but existing loaders are not capable of handling such a large package.

While loaders according to the present invention have been designed for handling such large packages they are also useful for handling other large and/or heavy loads whether on the farm or in factories or on railways.

According to the present invention a loader comprises a fore-and-aft directed support boom and a relatively movable parallel gripping boom and power means for moving the gripping boom horizontally towards the support boom and forcing it towards the support boom so that a load can be gripped between them.

The gripping boom conveniently moves by pivoting about a horizontal axis extending in a fore-and-aft direction and can be arranged so that the final movement before gripping a load is approximately horizontal. The pull of the hydraulic jack or other power means can be strong enough to grip a load by friction or with the assistance of inwardly directed prongs or the like and in general a lower horizontal support surface has been found not to be necessary.

This greatly simplifies the use of the loader since it can be moved into position to take up a load by moving the support boom forwardly, and as this can be a rigid cantilever-like boom, possibly with a lead-in fin at its leading end, the movement into position is quite simple. Then the gripping boom can be moved into its gripping position.

The support means for the support boom and the power means are conveniently positioned at or beyond the rear end of the booms so that they do not obstruct the gripping space between the booms and this also has the advantage that the weight of the loader can be concentrated at its rear end which makes it easier to support the loader and its load on a tractor. Power means on the loader can be used for lifting the loader and its load once the load has been gripped.

Figure 2:
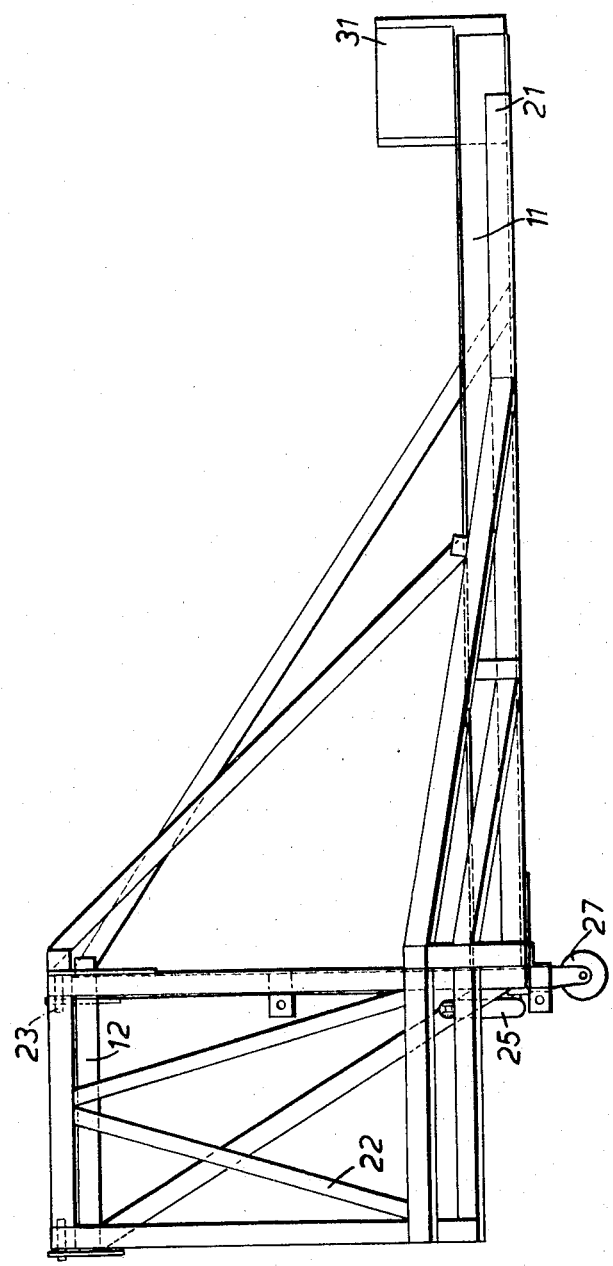
Figure 3:
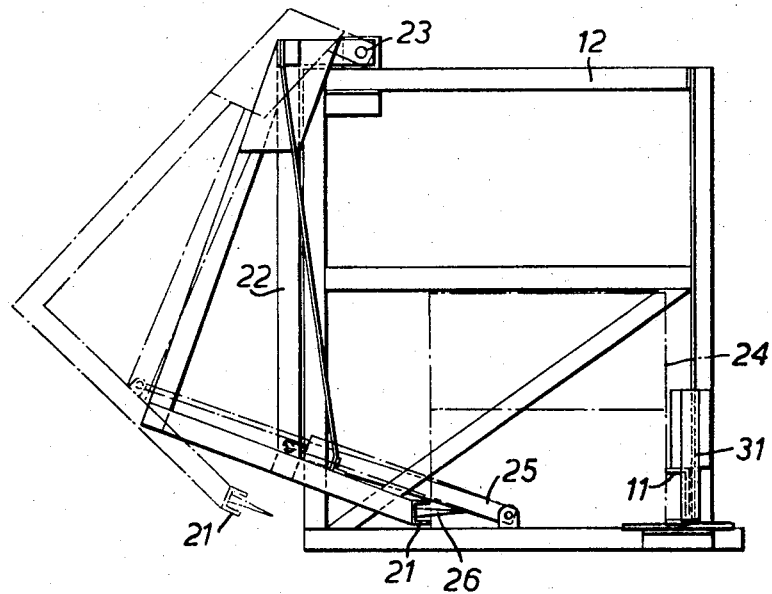
Figure 4:
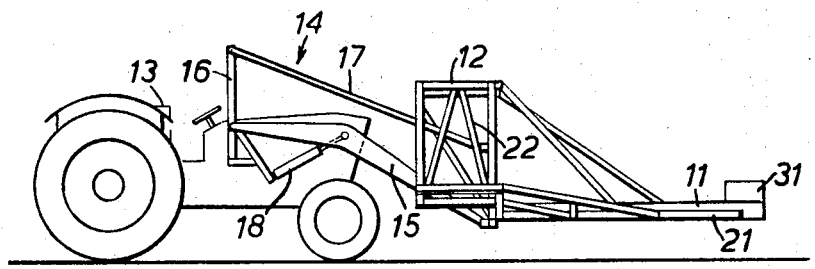

The invention may be carried into practice in various ways and one embodiment will be described by way of example with reference to the accompanying drawings of which:

FIGS. 1, 2 and 3 are respectively a plan, and side and front elevations of a loader, and FIG. 4 shows the loader mounted on a tractor.

The loader comprises a fixed fore-and-aft extending rigid cantilever-like support boom 11 carried on a frame 12 at its rear end, which frame is mounted at the front of the tractor 13 by two parallelogram linkages indicated generally at 14, one at each side of the tractor. Each linkage includes the conventional arm 15 provided with a tractor, an additional post 16 and an upper horizontal arm 17, with the frame 12 acting as the fourth side. The front jacks 18 of the tractor can be used to raise and lower the loader frame 12 and the locus of movement can be determined by appropriate design or adjustment of the linkages 14.

Horizontally spaced from one side of the support boom 11 is a gripping boom 21 which projects forwardly in cantilever fashion from a frame 22 which is pivoted to the frame 12 on a horizontal axis defined by hinges 23. FIG. 3 shows that the axis 23 is generally above the booms 11 and 21; it can be adjusted horizontally in accordance with the width of the particular bales 24 to be gripped. Then, as the gripping boom 21 moves about the hinge 23 to grip the bales, the last part of the movement will be approximately horizontal as can be seen best from FIG. 3.

This movement is effected by a hydraulic jack 25 extending between the frames 12 and 22 and well distending from the axis 23 to give a good turning moment. The jack, which uses the tractor hydraulics, is displaced beyond the rear end of the gripping boom 21 so as not to obstruct the space between the booms for picking up bales of straw.

Thus, if bales lying in a field are to be picked up, the tractor is driven so that the support boom 11 is on one side of the bales while the jack 25 is extended and the gripping boom 21 is in the position shown in chain lines in FIG. 3. Then the jack 25 is contracted so that the gripping boom 21 moves arculately downwardly and horizontally and is pulled tightly in to grip the bales against the fixed boom 11. Either or each boom may have prongs 26 to give a good grip, but in general the pull of the jack 25 will be adequate to hold the bales and to allow for any irregularities in the lengths of bales by compressing the gripping boom 21 into any bales which are slightly longer than their fellows.

If desired a roller or wheel 27 can be positioned below the frame 12 to keep the frame from digging into the ground, and to ensure that the boom is at the right height, but in many applications this will not be necessary because the centre of gravity of the loader will be rearwardly of the ends of booms and very near to the tractor. This is because the frames 12 and 22 and the jack 25 tend to be the heaviest parts of the loader and being mounted at the rear they do not obstruct the gripping space.

In general it will be desirable to have the booms as low as possible when bales are to be gripped.

The loader is particularly suitable for lifting and stacking large banded or unbanded stacks of individual bales of straw or hay. One method of obtaining such large banded stacks is the subject of U.S. Pat. application Ser. No. 115,336, and by using that method stacks with perhaps 10 or 20 bales can be banded to form a large package which is bigger and heavier than can be handled by existing loaders. However the loader described can handle such a large banded stack and load it on or off a trailer or transport it for storage in a barn or remove it from storage for use during the winter.

For this purpose the support boom 11 has a front lead-in fin 31 with inclined sides 32 so that it can easily be pushed into the vertical division between two adjacent stacked banded stacks of bales. Then when the gripping boom 21 is lowered and pulled against the exposed side of one stack, the tractor can be reversed to carry that stack away. This operation is made easy by the fact that there is no lower horizontal support surface extending transversely between the booms which would be very difficult to force under such a heavy banded stack of bales.

It will of course be clear that the loader could be mounted at the front or rear of the tractor.

It would be possible also to carry two banded stacks of bales at once by having a second gripping boom 21 positioned at the other side of the support boom 11 and operated in a similar manner by an independent jack 25.

It will be seen that the rod and sleeve hinges 23 are spaced apart by about one third the length of gripping boom 21. This keeps down the loading and strain necessary on the hinge to balance loads at the front of the gripping boom due to loads of non-uniform width. The hinges are the only parts which are relatively slidable and their movement is small: if therefore loading is kept down in this way, wear of sliding path will be very small, and this ensures that the boom is kept in correct alignment parallel with the boom 11 or slightly toed in. The strut 33 leading to the frame 22 and displaced from the hinge 23 supports the boom 21 and allows the movable parts to be cut away to allow for the fact that the loader is wider than the usual bales to be carried.

What we claim as our invention and desire to secure by Letters Patent is:

1. A loader for bales comprising a mobile frame, a fore-and-aft directed support boom fixedly supported by the frame and extending as a cantilever forwardly from the frame, a support, a fore and aft directed gripping boom supported as a cantilever from the support, a horizontal hinge connection between the gripping boom and the support, and a jack also positioned beyond the rear ends of the booms and capable of moving the gripping boom about its hinge in an arcuate path which extends downwardly and inwardly towards the support boom for gripping bales between the two booms, and a fin supported on the outer end of the support boom and having its leading edge beyond the outermost end of the gripping boom with a leading edge having vertical sides converging forwardly for being pushed between laterally adjacent bales in a stack to enable bales on one side of the pushed-in boom and fin to be gripped between the two booms and removed from the stack by withdrawal of the loader.

2. A loader as claimed in claim 1 in which the axis is adjustable in position.

3. A loader as claimed in claim 1 in which the pivot axis is defined by a hinge positioned at one end of the booms.

4. A loader as claimed in claim 1 in which the power means comprises a hydraulic jack positioned at or beyond one end of the booms.

5. A loader as claimed in claim 1 having means for mounting it on a tractor and having power means for lifting the loader in relation to the tractor.

6. A loader as claimed in claim 1 including wheel means for supporting some of the weight.

7. A loader as claimed in claim 1 in which one boom has gripping prongs directed towards the other boom.

8. A loader as claimed in claim 1 in combination with, and mounted on one end of, a tractor having power means, with the support boom extending in a fore-and-aft direction in the manner of a cantilever, the whole loader being capable of being lifted by the power means on the tractor.

9. A loader as claimed in claim 8 including an adjustable frame-work carrying the loader from the tractor.

* * * * *

UNITED STATES PATENT OFFICE
CERTIFICATE OF CORRECTION

Patent No. 3,771,678        Dated November 13, 1973

Inventor(s) Peter Arthur Taylor-Hawkins

It is certified that error appears in the above-identified patent and that said Letters Patent are hereby corrected as shown below:

In the title page please insert --Claims priority on British application 12611/70, filed March 16, 1970--

Correct the assignment information to read --Assigns one-half interest to Patterson's Venture Limited--

Signed and sealed this 9th day of April 1974.

(SEAL)
Attest:

EDWARD M. FLETCHER, JR.
Attesting Officer

C. MARSHALL DANN
Commissioner of Patents